United States Patent
Labrot et al.

(10) Patent No.: US 8,451,541 B2
(45) Date of Patent: May 28, 2013

(54) CURVED VEHICLE WINDSHIELD MADE FROM LAMINATED GLASS

(75) Inventors: Michael Labrot, Aachen (DE); Volkmar Offermann, Eschweiler (DE); Jean-Edouard De Salins, Paris (FR)

(73) Assignee: Saint-Gobain Glass France, Aubervilliers (FR)

( * ) Notice: Subject to any disclaimer, the term of this patent is extended or adjusted under 35 U.S.C. 154(b) by 117 days.

(21) Appl. No.: 12/746,687

(22) PCT Filed: Jul. 18, 2008

(86) PCT No.: PCT/EP2008/005881
§ 371 (c)(1),
(2), (4) Date: Aug. 24, 2010

(87) PCT Pub. No.: WO2009/071135
PCT Pub. Date: Jun. 11, 2009

(65) Prior Publication Data
US 2010/0314900 A1    Dec. 16, 2010

(30) Foreign Application Priority Data

Dec. 7, 2007  (DE) .......................... 10 2007 059323
Feb. 12, 2008  (DE) .......................... 10 2008 008758

(51) Int. Cl.
*G02B 27/14*    (2006.01)

(52) U.S. Cl.
USPC ........................................................ 359/630

(58) Field of Classification Search
USPC ................................................ 359/630–631
See application file for complete search history.

(56) References Cited

U.S. PATENT DOCUMENTS

| | | | | |
|---|---|---|---|---|
| 5,013,134 A | * | 5/1991 | Smith | 359/630 |
| 5,450,246 A | * | 9/1995 | Jain | 359/877 |
| 5,945,199 A | | 8/1999 | Morin et al. | |

FOREIGN PATENT DOCUMENTS

| | | |
|---|---|---|
| CA | 2076420 | 2/1993 |
| DE | 42 27 582 | 2/1993 |
| DE | 195 35 053 | 4/1996 |
| DE | 101 12 935 | 10/2002 |
| EP | 0 420 228 | 4/1991 |
| EP | 1 063 205 | 12/2000 |
| WO | 94/00787 | 1/1994 |
| WO | 02/103434 | 12/2002 |

* cited by examiner

*Primary Examiner* — James Greece
(74) *Attorney, Agent, or Firm* — Oblon, Spivak, McClelland, Maier & Neustadt, L.L.P.

(57) ABSTRACT

Interfering double images that occur with curved windshields made from laminated glass during night driving in transmission and with head-up displays in reflection can be reduced by a wedge-shaped thermoplastic intermediate film. The wedge-angle profile required for compensation of double images is determined locally as a function of pane shape and installation situation. If the vehicle has a head-up display system, the wedge-angle progression can be determined in the HUD field such that double images are prevented there in reflection. However, outside the HUD field, a wedge-angle progression that compensates double images in transmission is selected. The specifically adapted wedge-angle profile enables better compensation of double images than is possible with a film with a constant wedge angle.

11 Claims, 4 Drawing Sheets

CURVED VEHICLE WINDSHIELD MADE FROM LAMINATED GLASS

CROSS-REFERENCE TO RELATED APPLICATIONS

This application is a National Stage of PCT/EP08/005881 filed Jul. 18, 2008 and claims the benefit of DE 10 2007 059 323.8 filed Dec. 7, 2007 and DE 10 2008 008 758.0 filed Feb. 12, 2008.

The invention concerns a curved vehicle windshield made from laminated glass, whose outer and inner surfaces form a wedge angle with each other for prevention or for reduction of interfering double images at least in preferred regions.

For the driver of a vehicle, double images, also referred to as ghost images, can be very bothersome. In principle, there is a distinction between two different types of double images, i.e., on the one hand those that arise in transmission under specific contrast conditions and the double images that are seen when using head-up displays.

The double images arising in transmission through curved windshields appear, as a rule, during night driving from the headlight images of oncoming vehicles or other bright light sources. They arise as a result of multiple reflections on the surfaces of the windshield when a portion of the incident beams of light, the so-called secondary beam, leaves the windshield at an angle to the primary beam. The angle between the primary beam and the secondary beam is referred to as the double image angle. Since the intensity of the secondary beam is very low and is usually less than 1% of the intensity of the primary beam, the secondary beam is visible only if it can be picked out of the dark surroundings, i.e., at night or when driving through an unlighted tunnel.

Particularly bothersome are the double images that occur with head-up-displays (HUDs). With HUDs, an image that contains important data for the driver is projected onto the windshield by an optical device arranged on the top of the dashboard on the driver's side. The image is reflected on the windshield to the driver who sees a virtual image that appears to be in front of the vehicle. However, the driver sees two separate images, i.e., one image that is produced by reflection on the inner surface of the windshield and an additional image, the so-called ghost image, that is produced by the reflection on the outer surface of the windshield.

Double images observable in transmission occur with glass panes with so-called wedge errors and with curved glass panes. Since today's float glass panes that are used for the manufacture of windshields, in contrast to the formerly used glass panes, have virtually no wedge errors, double images are observed in transmission substantially only with curved glass panes. However, depending on the shape and the respective installation inclination of the windshields, the double images can assume quiet bothersome dimensions.

According to J. P. Aclocque "Doppelbilder als störender optischer Fehler der Windschutzscheibe [Double images as interfering optical errors in windshields]" in Z. Glastechn. Ber. 193 (1970) pp. 193-198, the double image angle can be calculated as a function of the radius of curvature and the angle of incidence of the light beam according to the following equation:

$$\eta = \frac{2t}{R_c} \cdot \frac{\sin\varphi}{\sqrt{n^2 - \sin^2\varphi}} \quad [1]$$

where
- $\eta$ is the double image angle,
- $n$ is the index of refraction of the glass,
- $t$ is the thickness of the glass pane
- $R_c$ is the radius of curvature of the glass pane at the location of the incident light beam, and
- $\varphi$ is the angle of incidence of the light beam relative to perpendicular to the pane.

Since, with flat glass panes, the double image angle $\eta$ depends according to the formula $$\eta = 2\delta \frac{\sqrt{n^2 - \sin^2\varphi}}{\cos\varphi} \quad [2]$$

on the wedge angle $\delta$ formed by the glass surfaces, it is possible, by setting the two equations equal, to calculate the wedge angle $\delta$ that is necessary for the elimination of the double image with a given radius of curvature $R_c$ and a given angle of incidence $\varphi$, according to the formula $$\delta = \frac{t}{R_c} \cdot \frac{\sin\varphi\cos\varphi}{n^2 - \sin^2\varphi} \quad [3]$$

From DE 19535053 A1 and DE 19611483 A1, it is known to use the physical relationships to reduce the interfering double images with curved glass panes in that for the manufacture of a windshield made from laminated glass, a bonding film with a wedge-shaped cross-section is used. The calculation of the wedge angle is based on a mean angle of incidence and a mean radius of curvature of the windshield. Through the measures proposed in this document, the amount of the double image angle based on the entire windshield is claimed to be reduced by at least 20%, and, in particular, by at least 60%. The thicker region of the bonding film is at the top, and with increasing curvature of the windshield, a bonding film with a larger wedge angle is used.

With windshields with a relatively simple curve, satisfactory results can be obtained with these known methods, i.e., with a bonding film with a constant wedge angle. With so-called panorama windshields, however, that are more curved in the upper region and possibly also in the side regions, the double images cannot be adequately reduced in this manner. Consequently, at least with complexly curved glass panes, double images that can significantly bother the driver are still visible in transmission.

Also with HUDs, it is, for example, known from EP 0420228 B1, for reduction of ghost images, to arrange an intermediate film layer with a wedge-shaped cross-section between the two glass panes. Thus, it is accomplished that the two surfaces of the windshield are not parallel to each other but instead enclose a small angle such that the two images reflected from the inner and the outer glass surface overlap each other and, ideally, completely cover each other. The optimal wedge angle also depends here, besides on the thickness of the windshield, the refractive coefficient of the glass, the position of the observer, and the position of the HUD image source, which one can assume to be constant values in the individual case, on the angle of incidence of the light beams and on the radius of curvature of the windshield in the region of the HUD viewing field. According to the mathematical formulas indicated in said patent, the wedge angle can be calculated according to known physical laws.

For flat windshields, the ghost images can be largely done away with by means of such intermediate layers with a wedge-shaped cross-section. However, usually, windshields are curved in the vertical and in the horizontal direction. With curved windshields, of course, the effect of the ghost images is already reduced to a certain extent by the vertical curvature, and an additional improvement is obtained by means of a wedge-shaped intermediate layer. However, the interfering double images are not completely eliminated since the wedge angle selected for the intermediate layer only results in complete coverage of the reflected images for a single point or for a line in the region of the HUD viewing field.

The manufacturer of intermediate films with a wedge-shaped thickness profile that extends continuously over the width of the film web from edge to edge offers no technical problems. However, when the manufactured film webs are wound into rolls for storage and shipping, the rolls assume an increasingly conical shape which causes difficulties in the handling and transport of the rolls. To prevent these difficulties, it is known from EP 0647329 to manufacture film webs that have, on both edges, a uniform thickness profile over a width of at least 20% of the web width followed by a wedge-shaped thickness profile that extends in each case to the center of the film web. These film webs that are wedge-shaped only in the central field can then be wound onto conventional cylindrical cores. The webs are separated in the center for further processing, cut to the desired shape, and combined with the individual glass panes such that the wedge-shaped part of the web lies in the bottom region of the windshield in which the HUD viewing window is arranged.

With such intermediate layers with an upper parallel-planed and a lower wedge-shaped cross-section, optical distortions occur in the finished laminated glass pane in the transitional region, i.e., along the boundary between the parallel-planed and the wedge-shaped cross-section. To avoid this disadvantage, from EP 1063205 an intermediate film for the manufacture of windshields with a HUD viewing field is known, which includes a cross-sectional profile that decreases in thickness as a curve. This known intermediate layer has, in the bottom region of the windshield in which the HUD viewing fields is [sic] located, a wedge-shaped cross-section and in the top region of the windshield a constant thickness, but the thickness change is not abrupt, but, instead, decreases in a curve. Certainly, the optical distortions occurring in this transitional region are thus reduced; however, the curve-shaped progression of the cross-sectional profile lies above the HUD viewing field and, consequently, has no additional influence on the ghost images since in the HUD viewing field itself, the intermediate film continues to have a constant wedge angle.

The development in automobiles is directed toward making increasingly more data available to the driver via the head-up display. That means, on the one hand, that the line widths of the displays become smaller. However, with smaller line widths, the lines of the ghost images are presented separate from the lines of the actual images and are, consequently, perceived separately by the observer such that the ghost images then are experienced as particularly bothersome. On the other hand, larger HUD viewing fields are needed for additional data such that the emergence of ghost images increases on the upper and lower edge of the HUD viewing field. For these reasons, the demands on the quality of the HUD images with regard to further minimizing the ghost images increase.

The object of the invention is to obtain a more extensive overlapping of the double images with curved windshields.

This object is accomplished according to the invention in that the two glass surfaces have continuously changing wedge angles depending on the respective local angle of incidence of the light beams and on the respective local radius of curvature of the windshield.

Since ultimately only the progression of the wedge angle enclosed by the glass surfaces is responsible for the double images and their compensation, it is, in principle, possible to incorporate the required wedge-angle progression into one of the individual glass panes used in the manufacture of the laminated glass or into both glass panes. The invention can, however, be realized economically when the required continuously changing wedge angles are incorporated into the thermoplastic intermediate film used for the manufacture of the windshield.

Relatively sharp curves of the glass panes are frequently associated with slight changes in thickness as a result of region-wise stretching of the glass. Consequently, it is advisable, in the determination of the continuously changing wedge angle, to take into account the changes in thickness caused by the deformation of the individual glass panes.

Complexly curved windshields that also have relatively sharp curves in the horizontal direction as well, for example, in the lateral end regions, and which, consequently, cause bothersome double images in transmission in these regions, are distinguished in an expedient improvement of the invention in that the surfaces of the windshield also have continuously changing wedge angles in the horizontal direction. For such windshields, intermediate films with a complex thickness profile that can be obtained, for example, by stacking two crossed wedge films, or even by subsequent surface coating of the intermediate film.

With complex geometries of the glass panes that have a relatively sharp curve both vertically and horizontally, it must, however, be taken into account in the calculation of the progression of the compensation wedge angles that the beam path no longer lies in one plane but is three-dimensional.

The required progression of the wedge angles and the resultant thickness profile of the intermediate film must be calculated separately for each pane shape. Expediently, the shape and the installation inclination of the windshield along the vertical center line of the windshield are the basis for the calculation of the compensation wedge angles that are required for the elimination of the double images occurring in transmission. Along this line, starting from the bottom edge of the windshield, the compensation wedge angles that are required in each case in these positions are determined using the aforementioned equation [3]. These calculations are continued up to the top edge of the windshield. In this manner, the complete progression of the wedge angles over the entire height of the pane is determined. From the wedge-angle progression thus determined, the thickness profile of the thermoplastic intermediate layer with which the individual glass panes are bonded to each other using heat and pressure is then calculated. This thickness profile is transferred to the finished laminated glass pane after the bonding of the glass panes.

For the calculation of the double image angles and the corresponding local compensation wedge angles, the arrangement as recommended in Test Specification ECE R43 Annex 3 for the determination of the double image angle may be selected. With this arrangement, the double image angles when the driver's head moves vertically from a bottom position up to a top end position are determined. In other words, the driver's direction of vision always remains horizontal. However, preferably, an arrangement is selected whereby the double image angle is calculated from a constant central position of the driver (eye point), whereby the vision angle of the driver through the windshield changes. It turned out that this arrangement corresponds more to practice than the arrangement provided for in the test specification.

The thickness profile according to the invention can be achieved through the use of an appropriate slotted nozzle during extrusion of the film or even with selective stretching of the film heated with the appropriate temperature profile. It is, however, also possible to produce the desired thickness profile by subsequent coating of the film. These methods may also be combined by producing, for example, the thickness profile in one direction with an appropriate slotted nozzle during extrusion and in the other direction by subsequent appropriate stretching of the film.

In order to eliminate the double images appearing in the viewing field in a HUD device, the windshield needs to have the wedge profile according to the invention only in the region of the HUD viewing field. In other words, the outer and the inner surface of the windshield have in this viewing field in the vertical direction a wedge angle that changes continuously from the bottom edge of the HUD viewing field to the top edge of the HUD viewing field and compensates the double images at every point on the vertical center line of the HUD field.

The thus continuously changing wedge angles result, in the region of the HUD viewing field, not in a linear but rather in a precisely calculated curve-shaped change in the thickness of the windshield. The wedge-angle progression required for complete overlapping of the images can be determined over the height of the HUD viewing field.

For windshields that tend to form double images in transmission as a result of their vertical curvature (transverse curvature) and their installation inclination, and which also have a HUD viewing field, the wedge-angle progression in the HUD viewing field is calculated, in an improvement of the invention, using the formulas reported later in detail such that the double images appearing in reflection are prevented, while, on the remaining surface of the pane, the wedge-angle progression is determined using the aforementioned equations of J. P. Acloque, such that outside the HUD viewing field the double images appearing in transmission are prevented.

Since in windshields with only slight transverse curvature, the danger of the creation of double images is only very slight, this means that the wedge angle for the compensation of the double images in transmission outside the HUD viewing field is virtually zero. However, since the films that have the required wedge-angle progression in the HUD viewing field normally also have, for manufacturing reasons, a wedge angle outside this field, the effect may develop that in these areas double images that would not be present with a film without a wedge angle, i.e., with parallel surfaces, then occur in transmission because of overcompensation. This effect can be prevented by an appropriate shaping of the bonding films.

In the following, the invention is explained in detail with reference in each case to an exemplary embodiment and the drawings. The drawings depict FIG. 1 a simplified schematic depiction of the progression of the beams that result in creation of the double image in transmission.

Figure 1:
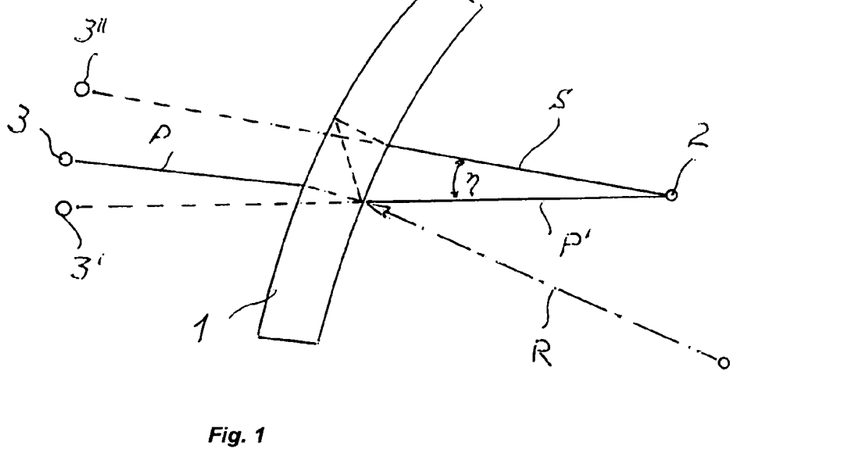

FIG. 1 depicts the basic beam progression as it leads, with beam passage through a curved windshield 1, to the creation of double images in transmission in the eye 2 of the driver. The primary light beam P, which enters the driver's eye 2 as primary beam P' after two-fold deflection on the two surfaces of the glass pane 1 emanates from the light source 3. However, the eye sees the bright light source 3 as the primary image 3' in extension of the primary beam P'. Inside the glass pane 1, a small portion of the primary beam P is reflected twice on the glass surfaces and leaves the glass pane as secondary beam S. The driver's eye 2 sees the double image 3" in extension of the secondary beam S. In the region, in which the primary beam emanating from the light source 3 strikes the glass pane 1, the glass pane 1 has a curvature with the radius of curvature $R_c$. The angle enclosed by the primary beam P' and the secondary beam S is the so-called double-image angle $\eta$.

In the following, the calculations for the determination of the wedge-angle progression according to the invention are performed for a specific windshield model that has been designed for a developmental vehicle.

The calculation proceeds such that the double-image angles n produced in the driver's eye are calculated along a vertical section in the center of the windshield according to the aforementioned formula [1] under consideration of the actual installation angle and a mean eye position.

In the following Table 1, the points on the vertical center line of the windshield, at each of which the calculation of the double-image angle was performed, are defined by their distance in mm from the hood edge MK. At these measurement points, the following values are determined in each case: on the one hand, the angle of inclination $\phi$ determined by the perpendicular to the tangent on the curved glass pane; on the other, the radius of curvature $R_c$ of the glass pane. From these data, using the aforementioned equation [1], first, the double-image angle $\eta$ is calculated; and, then, using the equation [3] the wedge angle $\delta$ that is required at this position for compensation of the double image. In the calculation formulas, the index of refraction of the glass is assumed to be 1.52, and the thickness t of the windshield 4.96 mm. The film thickness is determined using the values calculated for the wedge angles.

TABLE 1

| Distance from MK (mm) | $\phi$ (°) | $R_c$ (mm) | $\eta$ (') | $\delta$ (mrad) | Film thickness (mm) |
|---|---|---|---|---|---|
| 1531 | 68.17 | 3464 | 2.484 | 0.228 | 1.399 |
| 1429 | 59.95 | 3481 | 3.418 | 0.300 | 1.375 |
| 1327 | 53.18 | 3482 | 4.201 | 0.350 | 1.345 |
| 1225 | 47.75 | 3468 | 4.850 | 0.383 | 1.309 |
| 1123 | 43.43 | 3439 | 5.392 | 0.404 | 1.270 |
| 1021 | 40.02 | 3397 | 5.855 | 0.417 | 1.229 |
| 919 | 37.34 | 3343 | 6.259 | 0.426 | 1.186 |
| 817 | 35.24 | 3279 | 6.625 | 0.434 | 1.143 |
| 714 | 33.61 | 3207 | 6.964 | 0.441 | 1.098 |
| 612 | 32.37 | 3127 | 7.286 | 0.449 | 1.053 |

TABLE 1-continued

| Distance from MK (mm) | φ (°) | $R_c$ (mm) | η (') | δ (mrad) | Film thickness (mm) |
|---|---|---|---|---|---|
| 510 | 31.45 | 3042 | 7.602 | 0.459 | 1.008 |
| 408 | 30.80 | 2952 | 7.911 | 0.470 | 0.961 |
| 306 | 30.38 | 2859 | 8.220 | 0.483 | 0.913 |
| 204 | 30.17 | 2765 | 8.529 | 0.499 | 0.864 |
| 102 | 30.14 | 2670 | 8.836 | 0.516 | 0.813 |
| 0 | 30.12 | 2575 | 9.165 | 0.535 | 0.760 |

Since with conventional standard films, for reasons of puncture resistance of the windshield, the thickness is 0.76 mm, with the intermediate layer according to the invention the thickness of the film at its thinnest point likewise has the value of 0.76 mm. The thickness increases continuously to 1.399 mm at the top edge of the windshield.

Figure 2:
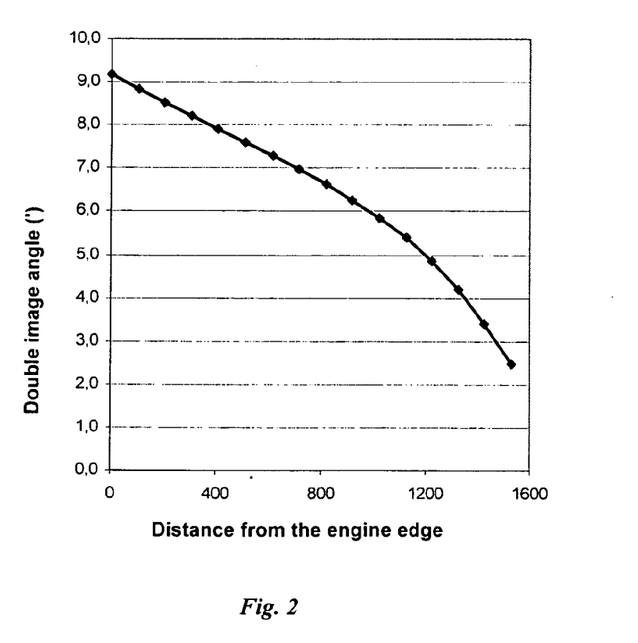
FIG. 2 a diagram that depicts, with a specific windshield shape, the progression of the double-image angles over the height of the windshield observed from the eye point.
Figure 3:
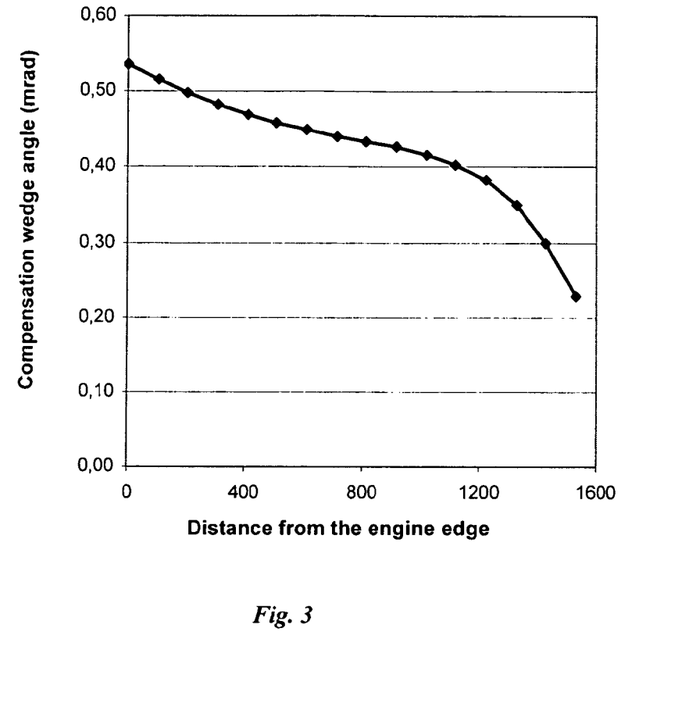
FIG. 3 a diagram that depicts the progression of the calculated compensation wedge angles over the height of the windshield.
Figure 4:
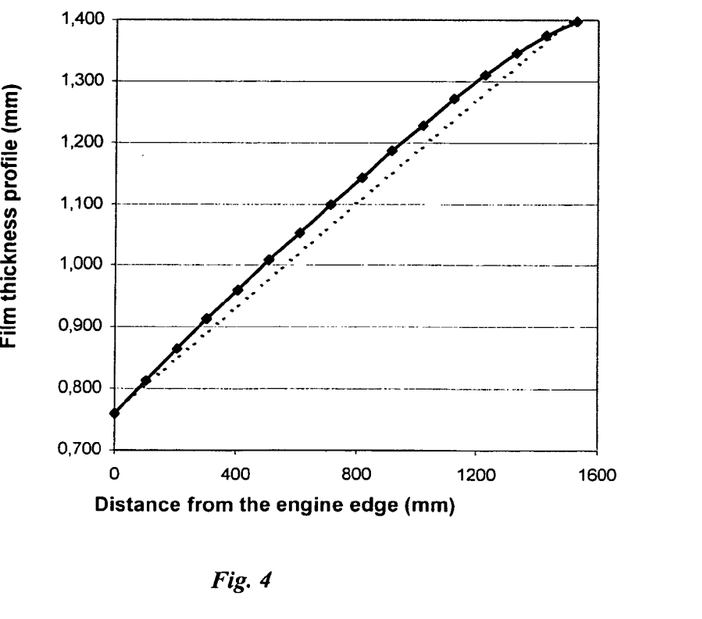
FIG. 4 the progression of the thickness profile of the intermediate film corresponding to the compensation wedge angles.

The values thus calculated for the double-image angle η, the compensation wedge angle δ, and the film thickness are presented in FIG. 2 through 4 in the form of corresponding diagrams. Whereas FIG. 2 presents the progression of the double-image angle η (in angular minutes) with increasing distance from the hood edge MK, FIG. 3 shows the progression of the compensation wedge angle δ in mrad, likewise with increasing distance from the hood edge MK. And finally, FIG. 4 shows the thickness profile of the intermediate film that results in the required constantly changing wedge angle between the surfaces of the glass when the individual glass panes are bonded to each other with such an intermediate film using heat and pressure.

In FIG. 4 the solid curve represents the thickness profile of the intermediate film according to the invention corresponding to the table. In contrast, the dotted curve shows the linear progression of the thickness profile of the intermediate film corresponding to the prior art with a constant wedge angle. It is clearly discernible that the thickness profile according to the invention is clearly different from the linear thickness profile.

During the process of bending the glass panes, i.e., in the transition from the two-dimensional to the three-dimensional shape, depending on the extent of bending, the glass panes are slightly expanded in regions, which is inevitably associated with changes in thickness. These changes in thickness can amount, in the case of spherically curved glass panes, to a few μm, in the regions that have been locally subjected to greater heat. These inevitable changes in thickness that affect the wedge-angle progression in one direction or the other depending on the shape of the windshield must accordingly be taken into account for the final determination of the wedge-angle progression. Even the minimal expansion of the intermediate film that occurs during the bonding process, i.e., during the transition from the two-dimensional to a three-dimensional form, must be considered in the determination of the wedge-angle progression.

Even small geometric deviations can have a significant effect on the double images. However, it is usually possible during the prototype phase of automotive engineering to further attune the wedge-angle profile precisely to the given situation.

Whereas the previously described exemplary embodiment related to the elimination of double images that are observed in transmission with curved windshields; in the following, an exemplary embodiment that relates to the elimination of the double images that occur in a HUD viewing field is described with reference to FIG. 5 through 8.

Figure 5:
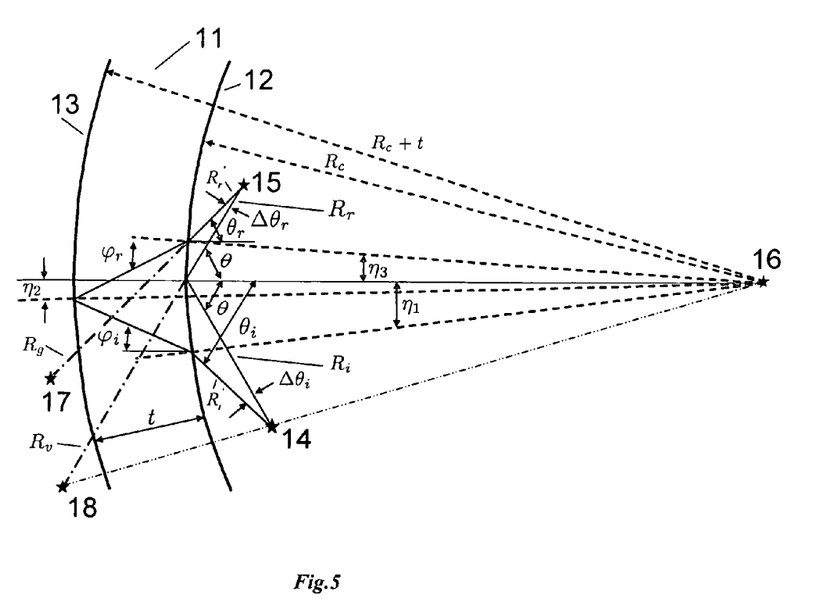
FIG. 5 a schematic depiction of the beam path that results in the creation of ghost images with a head-up display.
Figure 6:
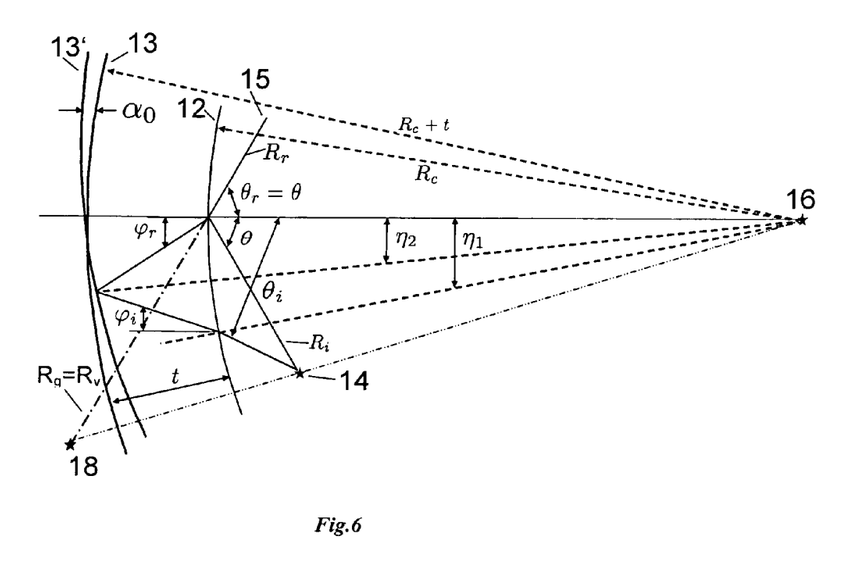
FIG. 6 the same beam path as in FIG. 5, but with windshield shaping according to the invention in the HUD viewing field.

In FIGS. 5 and 6, the windshield 11 is depicted only by its inner surface 12 and its outer surface 13, since, here again, only these two surfaces are responsible for the reflection images. The thickness of the windshield has the value t. The light beam $R_i$ emanating from the light source 14 strikes the inner surface 12 of the glass pane, which has at this point a radius of curvature $R_c$ with the center 16 of the circle, at the angle of incidence θ. The light beam is reflected at the same angle θ from this glass surface into the eye 15 of the observer as light beam $R_r$. The eye 15 of the observer sees the light source 14 as a virtual image 18 outside in front of the windshield 11. At the same time, the light beam $R_i'$ emanating from the light source 14 penetrates the glass pane 11 at an angle corresponding to the index of refraction of the glass pane (since the index of refraction of the silicate glass and the index of refraction of the intermediate film are quite similar, it is possible to assume a uniform index of refraction of the laminated glass pane) and reaches the eye 15 of the observer after being refracted again on the inner glass surface as reflected light beam $R_r'$. The eye 15 of the observer sees this reflected image in extension of the light beam $R_r'$ as double image 17.

FIG. 6 illustrates how, through angular repositioning of the outer glass surface 13 by the wedge angle $α_0$ into the position 13', the light beam reflected on the outer glass surface can be shifted such that it coincides with the light beam $R_v$ reflected on the inner surface 12 such that the double image completely overlaps the virtual image 18.

As is discernible from these drawings, the wedge angle $α_0$ is dependent on the angle of incidence θ, the local radius of curvature $R_c$ of the windshield at this point, the distance $R_i$ of the light source from the windshield, the thickness t, and the index of refraction of the windshield. The following parameters depicted in the drawings also appear in the formulas for calculation of the optimal wedge angle that results in complete overlapping of the ghost image and the virtual image:

$R_v$ the distance between the observer and the virtual image
$R_g$ the distance between the observer and the ghost image
$θ_i$ the angle of incidence of the secondary beam
$θ_r$ the angle of the secondary beam leaving the inner glass surface
$η_1$ the angle between the perpendicular through the reflection point of the primary beam and the perpendicular through the point at which the secondary beam penetrates the glass pane
$η_2$ the angle between the perpendicular in the reflection point of the primary beam and the perpendicular in the reflection point of the secondary beam on the outer glass surface
$η_3$ the angle between the perpendicular in the reflection point of the primary beam and the perpendicular in the point at which the secondary beam leaves the inner glass surface
$φ_i$ the angle between the horizontal and the secondary beam inside the glass pane, and
$φ_r$ the angle between the horizontal and the secondary beam inside the glass pane reflected on the outer glass surface.

In this case, "primary beam" means the light beam reflected on the inner glass surface 12, and "secondary beam" means the light beam reflected on the outer glass surface 13, which have the same starting point and are seen simultaneously by the observer.

The determination of the virtual images for the optical beam path depicted in FIG. 5 takes place using the law of refraction on the primary and secondary beam according to the following equations:

$$\sin(\theta_i+\eta_1)=n\cdot\sin(\phi_i+\eta_1) \text{ and } \sin(\theta_r+\eta_3)=n\cdot\sin(\phi_r+\eta_3)$$

Reflections on the boundary surfaces between the two individual glass panes and the intermediate PVB layer are ignored since they have roughly the same index of refraction of n=1.52.

Projection of the primary beam and the secondary beam onto the vertical axis yield the equation $$(R_i+R_r)\sin\theta=(R_i\tan\theta_i+R_r\tan\theta_r)\cos\theta+t(\tan\phi_i+\tan\phi_r)$$

The wedge angle is executed by rotation of the outer glass surface around the intersection with the primary axis. Rotation by an angle $\alpha$ then effects a rotation of the reflected beam by the angle $2\alpha$. This yields $$2\alpha=\phi_r-\phi_i+2\eta_2$$

The determination of the angle $\eta$ requires approximations that are strictly valid only for small angles:

$$\tan\eta_1 = \frac{R_i\sin(\theta-\theta_i)}{R_c\cos\theta_i}$$

$$\tan\eta_2 = \frac{t\tan\phi_i - R_c\tan\eta_1}{R_c+t}$$

$$\tan\eta_3 = \frac{t(\tan\phi_i+\tan\phi_r) - R_c\tan\eta_1}{R_c}$$

This set of equations can be solved numerically, e.g., by nested intervals. The optimal wedge angle $\alpha_0=\alpha_0(R_i, R_c, t, \theta, n)$ for elimination of the double image is independent of the distance $R_r$ of the observer 15.

In the exemplary embodiment reported in the following, the corresponding data of an actual curved windshield and an actual installation position were used. The thickness of the windshield is 4.46 mm, and the index of refraction 1.52. The calculations were performed for a HUD viewing field with a height of ca. 225 mm, with the required parameters calculated at 11 different positions on the vertical center line in the HUD viewing field. The individual data and the values for the wedge angles required are reported in Table 2.

TABLE 2

| HUD Viewing Field | Position (mm) | Angle of Incidence | $R_c$ (mm) | $R_i$ (mm) | Wedge Angle |
|---|---|---|---|---|---|
| Top | 224.76 | 59.45 | 5948 | 1096 | 0.37 |
|  | 203.19 | 60.01 | 6290 | 1077 | 0.38 |
|  | 181.62 | 60.55 | 6683 | 1057 | 0.39 |
|  | 160.05 | 61.07 | 7135 | 1038 | 0.401 |
|  | 138.47 | 61.58 | 7671 | 1019 | 0.411 |
| Center | 116.9 | 62.08 | 8301 | 1000 | 0.422 |
|  | 93.52 | 62.61 | 9132 | 979 | 0.434 |
|  | 70.14 | 63.12 | 10164 | 959 | 0.446 |
|  | 46.76 | 63.62 | 11481 | 939 | 0.458 |
|  | 23.38 | 64.12 | 13213 | 918 | 0.47 |
| Bottom | 0 | 64.61 | 15587 | 898 | 0.482 |

Figure 7:
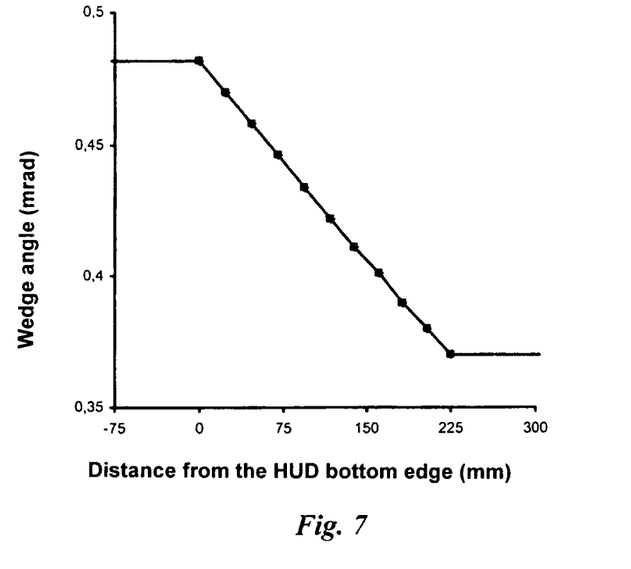
FIG. 7 the progression according to the invention of the wedge angle between the inner and outer glass surface in the region of the HUD viewing field, and FIG. 8 the progression of the thickness profile of the intermediate film in the region of the HUD viewing field, when the desired wedge angle progression is to be obtained exclusively through the thickness profile of the intermediate film.

In FIG. 7, the calculated wedge-angle progression is presented as a function of the position in the HUD viewing field. All values refer to the vertical center line in the HUD viewing field, with the data on the abscissa referring to the distance in mm from the bottom edge of the HUD viewing field, and the associated wedge angles reported in mrad. The wedge angle decreases linearly in the region of the HUD viewing field from 0.482 mrad at the bottom edge of the viewing field to 0.370 mrad at the top edge. In the manufacture of the thermoplastic film, such a wedge-angle progression can be realized through corresponding design of the extruder nozzles.

How this wedge-angle progression affects the thickness profile of the thermoplastic intermediate layer is determined by the corresponding conversion. Table 3 reports the values of the film thickness for the individual positions within the HUD viewing field.

TABLE 3

|  | Position (mm) | Film thickness (mm) |
|---|---|---|
| top | 224.76 | 0.999 |
|  | 203.19 | 0.991 |
|  | 181.62 | 0.983 |
|  | 160.05 | 0.974 |
|  | 138.47 | 0.966 |
| center | 116.90 | 0.957 |
|  | 93.52 | 0.947 |
|  | 70.14 | 0.937 |
|  | 46.76 | 0.926 |
|  | 23.38 | 0.916 |
| bottom | 0.00 | 0.905 |
|  | −300 | 0.760 |

The calculation is based on the assumptions that the HUD field starts at a distance of 300 mm from the bottom edge of the windshield and that the wedge angle in this bottom region is constant and corresponds to the value at the bottom edge of the HUD field. Under these assumptions, the film thickness at the bottom edge of the windshield corresponds to the conventional thickness of 0.76 mm. Above and below the HUD viewing field, a constant wedge angle is likewise assumed in this example such that the film thickness in these regions increases linearly.

However, if double images in transmission are not adequately compensated outside the HUD field, it is possible, particularly in the top region of the windshield, to continuously change the wedge-angle progression according to the calculation method described such that the danger of the creation of double images in transmission is largely avoided there.

If very different wedge angles appear in the transitional region from the HUD field to the top region of the pane, it is possible to adapt the curve transition within a certain transition region to prevent optical interference. The transitional region should lie outside the HUD field so that the HUD function is not reduced in the HUD field.

Figure 8:
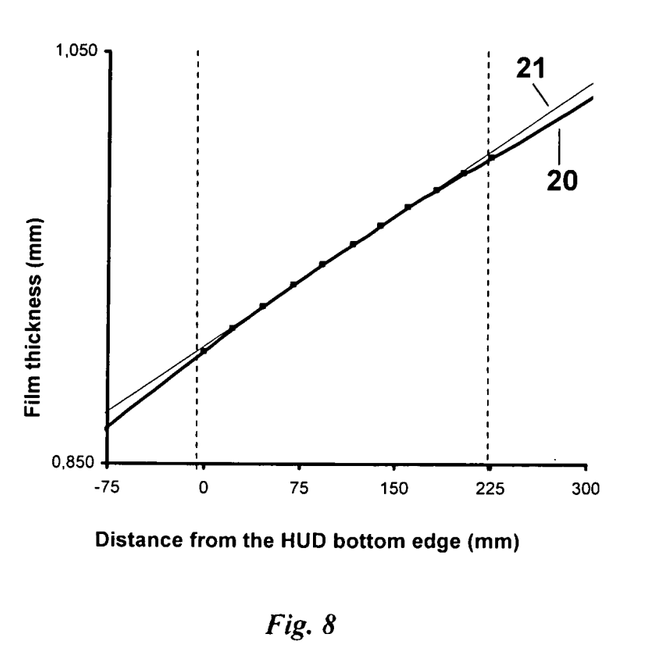

In FIG. 8 the curve 20 represents the thickness profile of the intermediate film corresponding to Table 3. In contrast, the curve 21 shows the linear progression of the thickness profile of the intermediate film with a constant wedge angle. Whereas the curve 20 is linear above and below the 225-mm-high HUD viewing field, i.e., has a constant wedge angle, in the region of the HUD viewing field, it has a curve-shaped progression clearly deviating from a straight line.

In this case as well, the changes in thickness of the glass panes that inevitably occur during the bending process, and likewise the minimal expansions of the intermediate film that take place during the bonding process, must be accordingly taken into account for the final determination of the wedge-angle progression.

Even small geometric deviations can have a significant effect on the optical properties of the HUD viewing field. However, it is usually possible during the prototype phase of automotive engineering to further attune the wedge-angle profile precisely to the given situation.

In summary, interfering double images that occur with curved windshields made from laminated glass during night driving in transmission and with head-up displays in reflection can be reduced by a wedge-shaped thermoplastic intermediate film. The wedge-angle profile required for compensation of double images is determined locally as a function of pane shape and installation situation. If the vehicle has a head-up display system, the wedge-angle progression can be determined in the HUD field such that double images are prevented there in reflection. However, outside the HUD field, a wedge-angle progression that compensates double images in transmission is selected. The specifically adapted wedge-angle profile enables better compensation of double images than is possible with a film with a constant wedge angle.

Accordingly, what has been shown is a curved vehicle windshield made from laminated glass and related methods. While the windshield and methods have been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

The invention claimed is:

1. A method comprising manufacturing a vehicle windshield comprising an outer surface and an inner surface, the outer surface and the inner surface forming a wedge angle with each other in one or more regions for prevention or reduction of interfering double images, wherein the outer surface and the inner surface have continuously changing wedge angles, the wedge angles depending on a respective local angle of incidence of light beams and on a respective local radius of curvature of the curved vehicle windshield, wherein compensation wedge angles δ required for compensation of double images interfering in transmission are calculated depending on local angles of incidence φ and local radii of curvature $R_c$ of the windshield according to the formula $$\delta = \frac{t}{R_c} \cdot \frac{\sin\varphi\cos\varphi}{n^2 - \sin^2\varphi},$$

where t represents the thickness of the windshield and n represents the index of refraction, along the vertical center line of the windshield.

2. The method according to claim 1, wherein the wedge angles decrease continuously from the bottom edge to the top edge of the windshield.

3. The method according to claim 1, wherein the continuously changing wedge angles change continuously in a horizontal direction in regions with high horizontal curvature.

4. The method according to claim 1, the curved vehicle windshield having a head-up display (HUD) viewing field, wherein the continuously changing wedge angles change continuously from bottom to top in a region of the HUD viewing field.

5. The method according to claim 4, wherein the continuously changing wedge angles also continuously change in a horizontal direction of the region of the HUD viewing field.

6. The method according to claim 1, wherein the continuously changing wedge angles are incorporated into an intermediate film.

7. The method according to claim 1, wherein changes in thickness caused by deformation of individual glass sheets are taken into account when determining the continuously changing wedge angles.

8. The method according to claim 1, said curved vehicle windshield having a head-up display (HUD) viewing field with a continuously changing wedge angle preventing double images in reflection and, outside the HUD viewing field, continuously changing wedge angles preventing the double images appearing in transmission.

9. The method according to claim 1, wherein progression of the compensation wedge angles in a horizontal direction of vision, is calculated from a lower end position to an upper end position.

10. The method according to claim 1, wherein progression of the compensation wedge angles is calculated from a constant central position of the driver.

11. A method comprising manufacturing a vehicle windshield comprising an outer surface and an inner surface, the outer surface and the inner surface forming a wedge angle with each other in one or more regions for prevention or reduction of interfering double images, wherein the outer surface and the inner surface have continuously changing wedge angles, the wedge angles depending on a respective local angle of incidence of light beams and on a respective local radius of curvature of the curved vehicle windshield, wherein compensation wedge angles δ required for compensation of double images interfering in transmission are calculated depending on local angles of incidence φ and local radii of curvature $R_c$ of the windshield according to the formula $$\delta = \frac{t}{R_c} \cdot \frac{\sin\varphi\cos\varphi}{n^2 - \sin^2\varphi},$$

where t represents the thickness of the windshield and n represents the index of refraction, along the vertical center line of the windshield.

* * * * *

UNITED STATES PATENT AND TRADEMARK OFFICE
CERTIFICATE OF CORRECTION

PATENT NO. : 8,451,541 B2
APPLICATION NO. : 12/746687
DATED : May 28, 2013
INVENTOR(S) : Michael Labrot et al.

Page 1 of 1

It is certified that error appears in the above-identified patent and that said Letters Patent is hereby corrected as shown below:

In the Specifications

Column 6, line 33, "n" should be -- η --.

Signed and Sealed this
Twentieth Day of August, 2013

Teresa Stanek Rea
*Acting Director of the United States Patent and Trademark Office*